United States Patent [19]

Ueda et al.

[11] Patent Number: 4,672,520
[45] Date of Patent: Jun. 9, 1987

[54] CURRENT-SOURCE POWER CONVERTING APPARATUS WITH SELF-EXTINCTION DEVICES

[75] Inventors: Shigeta Ueda, Hitachi; Mitsuyuki Hombu, Katsuta; Kazuo Honda, Hitachioota; Akiteru Ueda, Ibaraki; Katsunori Suzuki, Takahagi; Seiya Shima, Katsuta, all of Japan

[73] Assignee: Hitachi, Ltd., Tokyo, Japan

[21] Appl. No.: 789,826

[22] Filed: Oct. 21, 1985

[30] Foreign Application Priority Data

Oct. 23, 1984 [JP] Japan ................................. 59-222374

[51] Int. Cl.4 ............................................. H02M 5/45
[52] U.S. Cl. ....................................... 363/37; 363/54; 363/129; 363/137; 307/66
[58] Field of Search ........................ 363/34, 37, 50, 51, 363/54, 123, 125, 127, 128, 129, 131, 132, 135, 136, 137; 307/46, 48, 66

[56] References Cited

U.S. PATENT DOCUMENTS 4,246,633 1/1981 Borkovitz .............................. 363/37
4,340,823 7/1982 Miyazawa ............................ 307/66

Primary Examiner—Patrick R. Salce
Assistant Examiner—Anita M. Ault
Attorney, Agent, or Firm—Antonelli, Terry & Wands

[57] ABSTRACT

A current-source power converting apparatus having a three phase AC-DC converter composed of self-extinction devices for converting an AC power furnished from an three phase AC power source into a DC power and a DC-AC inverter connected with the AC-DC converter through a DC reactor for re-converting the DC power into a three phase AC power to supply the re-converted power for a load. When the failure of the AC power source is detect according to one embodiment, the AC power source is detached from the AC-DC converter and a battery is connected between arbitrary two phases at the input end of the AC-DC converter. After that, the DC power of the battery is supplied for the DC-AC inverter intermittently by switching the corresponding self-extinction devices of the AC-DC converter and controlled by varying the duty ratio of the switching operation.

4 Claims, 15 Drawing Figures

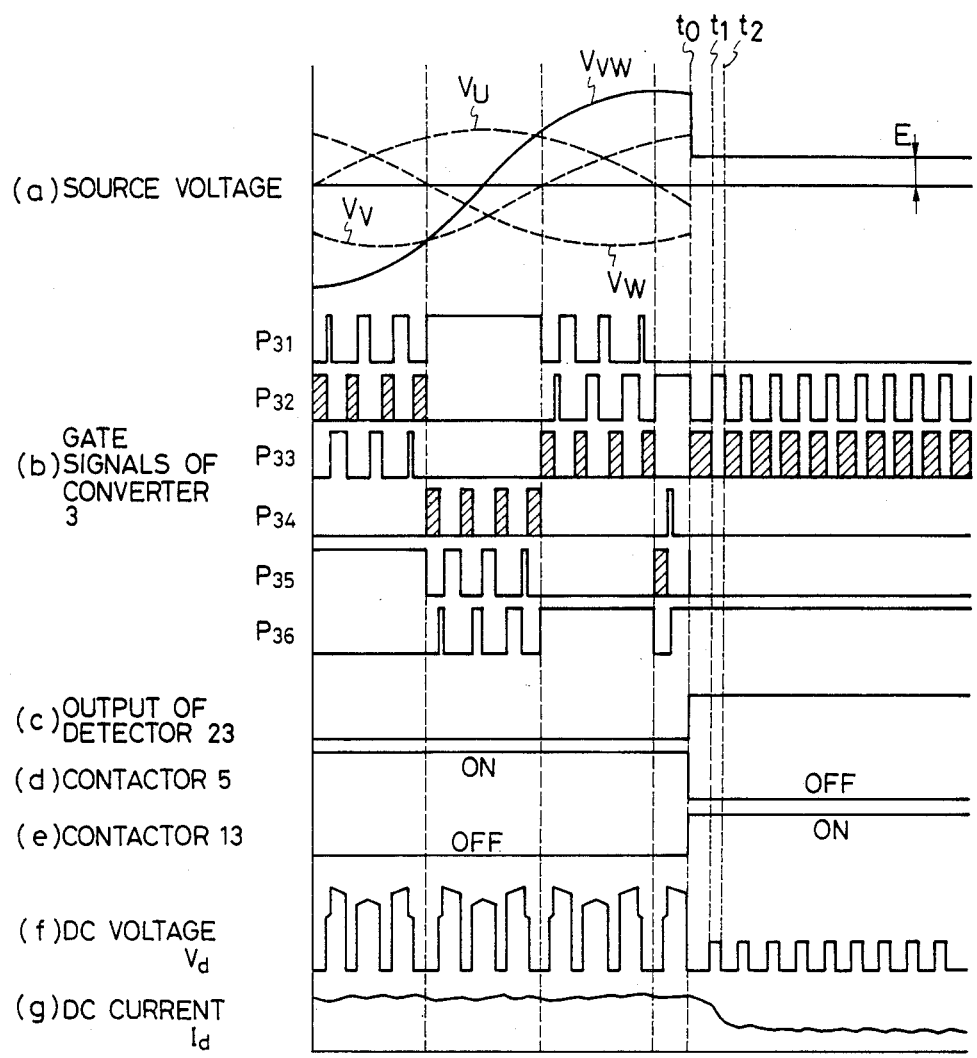

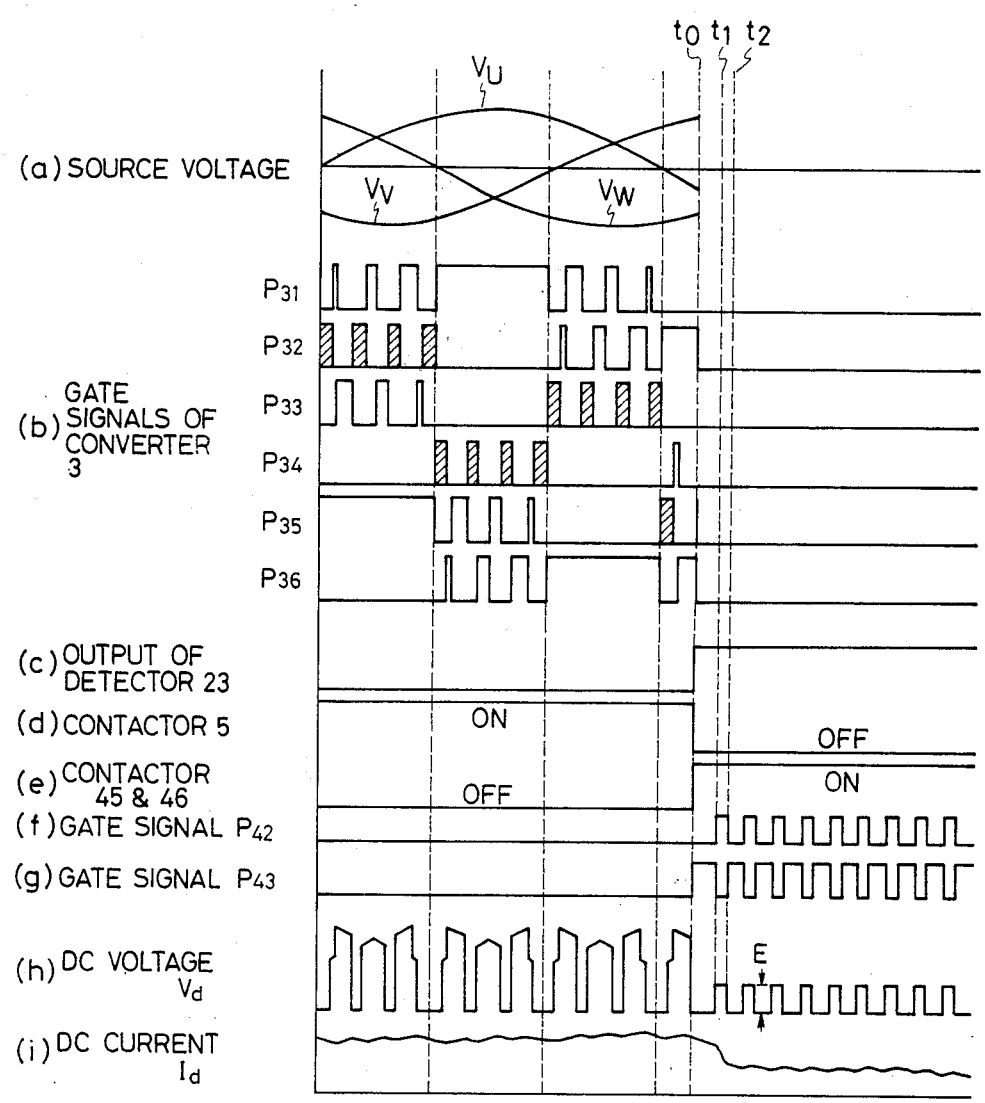

($t_0 \leq t < t_1$)

($t_1 \leq t < t_2$)

($t_2 \leq t < t_3$)

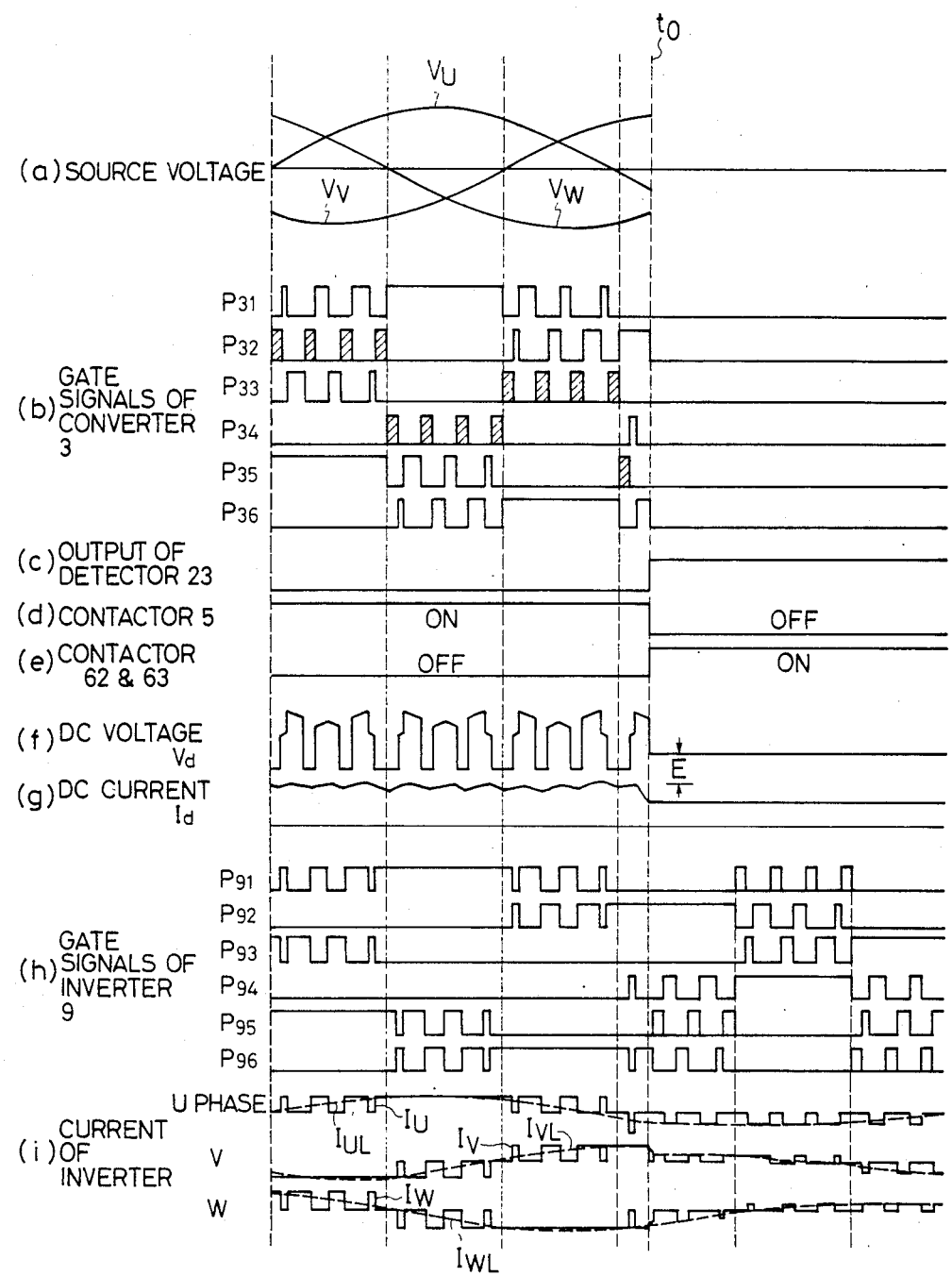

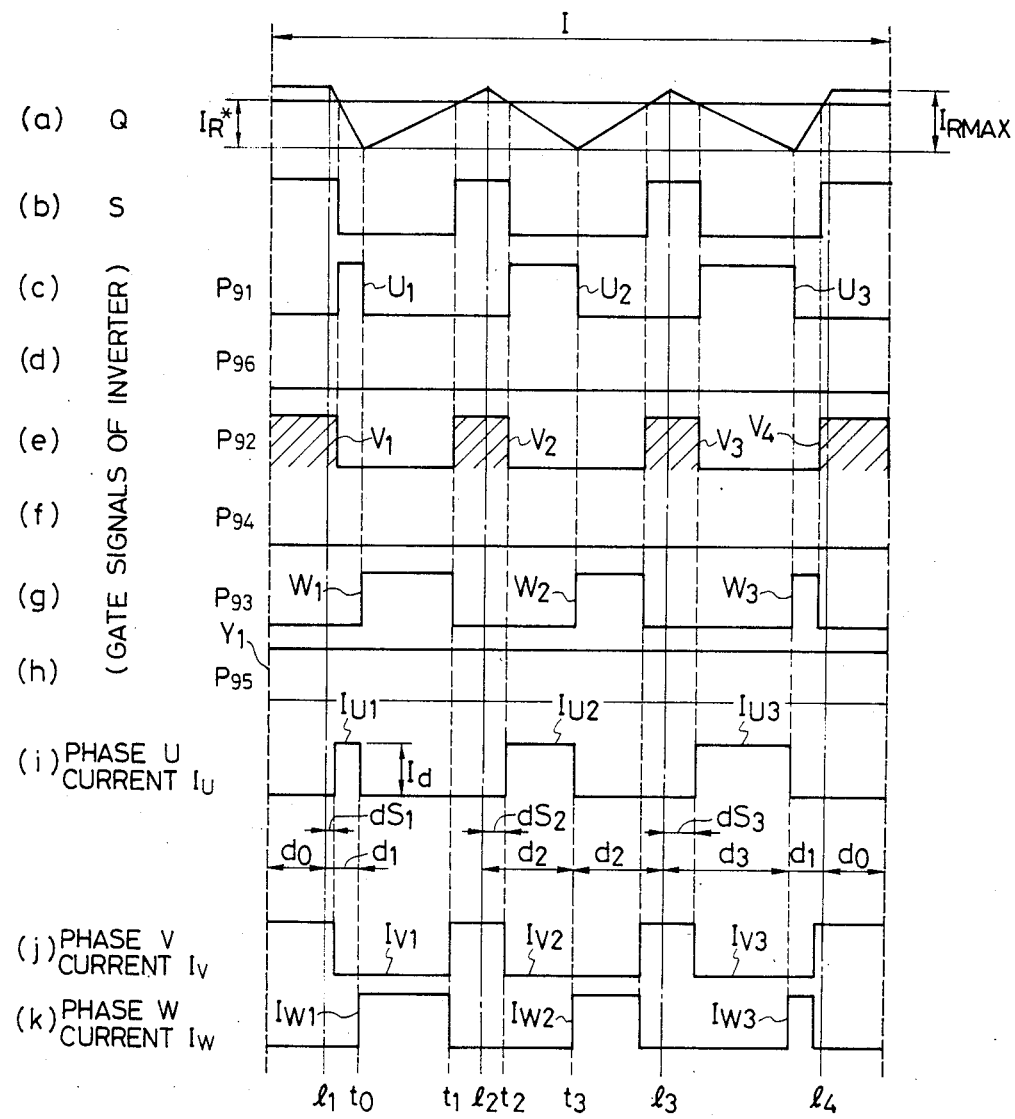

CURRENT-SOURCE POWER CONVERTING APPARATUS WITH SELF-EXTINCTION DEVICES

BACKGROUND OF THE INVENTION

1. Field of the Invention

The present invention relates to a current-source power converting apparatus with self-extinction devices, and more particularly to the power converting apparatus which includes an AC-DC converter for converting an alternating current power furnished from an AC power source into a direct current power and a DC-AC inverter connected with the AC-DC converter through a direct current reactor for re-converting the direct current power into an alternating current power to supply the reconverted power for a load, and which is suitable for continuing operation of the DC-AC inverter even at the time of failure of the AC power source.

2. Description of the Related Art

There is a demand that, even if an AC power source fails, a power converting apparatus fed from the AC power source must continue to operate for a while. For example, a driving motor for an elevator is required to continue to operate until an elevator cage running at that time reaches the most neighboring floor safely. The power converting apparatus supplying such a driving motor with the electric power has to continue the feeding of the necessary power, the performance thereof being more or less derated.

Usually, two types of the power converting apparatus are known; one type is a so called voltage-source type and the other a current-source type. The former has been used rather more frequently from the reason as follows.

In the voltage-source power converting apparatus, an AC-DC converter included in such apparatus has not been required to be capable of controlling its output DC voltage. The AC-DC converter was sufficient only to output the DC power of the constant voltage, because the control of the voltage applied to a load can be easily realized by a DC-AC inverter connected to the AC-DC converter. Accordingly, at the time of failure of an AC power source, the AC-DC converter is replaced by a battery which can supply the DC-AC inverter with the DC power of the constant voltage, and the voltage of the AC power supplied for the load is controlled by the usual control method of the DC-AC inverter.

However, when the voltage-source power converting apparatus conducts a regenerative operation, it becomes necessary to provide another converter exclusively used for the regenerative operation. On the other hand, in the current-source one, the power converting apparatus can achieve the regenerative operation by only the gate control of one converter without any further converter. Therefore, the current-source power converting apparatus is used, when the regenerative operation is required.

Contrary to the case of the voltage-source type, however, a DC-AC inverter used in a current-source power converting apparatus is very difficult to control the voltage of its output AC power. Such control has been scarcely feasible in a practical use. Therefore, an AC-DC converter connected with the DC-AC inverter through a DC reactor has to fill the role of voltage control of the AC power supplied for a load as the final output of the current-source power converting apparatus. That is to say, the voltage of the DC power furnished for the DC-AC inverter has to be controlled by the AC-DC converter. Accordingly, the DC-AC inverter can not continue to operate by merely substituting a battery for the AC-DC converter at the time of failure of an AC power source. Such substitution of the battery for the converter made possible the continuous operation of the inverter at the time of failure of the AC power source in a case of the foregoing voltage-source power converting apparatus.

Now, in a conventional example, a current-source power converting apparatus employing self-extinction devices utilizes the DC short circuiting mode of operation for a usual control of the DC voltage by means of the AC to DC conversion. In order to make such a power converting apparatus operate continuously at the time of failure of an AC power source, a battery is connected to the apparatus and the control of DC voltage must be performed by the DC to DC transformation. Since, however, the DC to DC transformation necessiates the provision of a freewheel diode, the arrangement of a main circuit of the usual converter is not suited for control of the DC voltage. Further, in case the freewheel diode is connected to the output end of the AC-DC converter, there arises a defect that the regeneration becomes impossible in the usual operation.

SUMMARY OF THE INVENTION

An object of the present invention is to provide a current-source power converting apparatus which comprises an AC-DC converter connected to an AC power source and a DC-AC inverter supplied with the DC power from the AC-DC converter through a DC reactor, at least the AC-DC converter being composed of self-extinction devices, and which is capable of making the DC-AC inverter operate continuously by supplying the DC power from a battery at the time of failure of the AC power source.

According to a feature of the present invention, there is provided in the current-source power converting apparatus as described above a DC power supplying means which is capable of supplying the DC power of the intermittent voltage for a load during the failure of the AC power source, wherein the DC power supplied for the load is controlled by varing the degree of the intermittence. Further the DC power supplying means includes a battery for supplying the DC power which is connected on the side of the AC-DC converter with respect to the DC reactor arranged between the AC-DC converter and the DC-AC inverter.

In one of the embodiments according to the present invention, the DC power supplying means supplies the DC power of the battery for the inverter intermittently by using the self-extinction devices of the AC-DC converter.

According to another embodiment, the DC power supplying means includes a particular switching means for supplying the DC power of the battery for the inverter intermittently.

According to still another embodiment, the DC power supplied for the DC-AC inverter from the battery is controlled intermittently by the DC-AC inverter itself.

Other objects and features of the present invention will become apparent upon reading the specification and inspection of the drawings and will be particularly pointed out in the appended claims.

BRIEF DESCRIPTION OF THE DRAWINGS

FIG. 2 shows the waveforms of signals and voltage/current which are applied to or derived from various parts of the circuit shown in FIG. 1, and the figure includes those before and after occurence of the failure of an AC power;

FIG. 5 shows the waveforms of signals and voltage/current which are applied to or derived from various parts of the circuit shown in FIG. 4, and the figure includes those before and after occurence of the failure of an AC power;

FIG. 8 shows the waveforms of signals and voltage/current which are applied to or derived from various parts of the circuit shown in FIG. 7, and the figure includes those before and after occurence of the failure of an AC power;

FIG. 10 is an expanded diagram of a part of the drawing of FIG. 9; and

DESCRIPTION OF THE PREFERRED EMBODIMENTS

Figure 1:
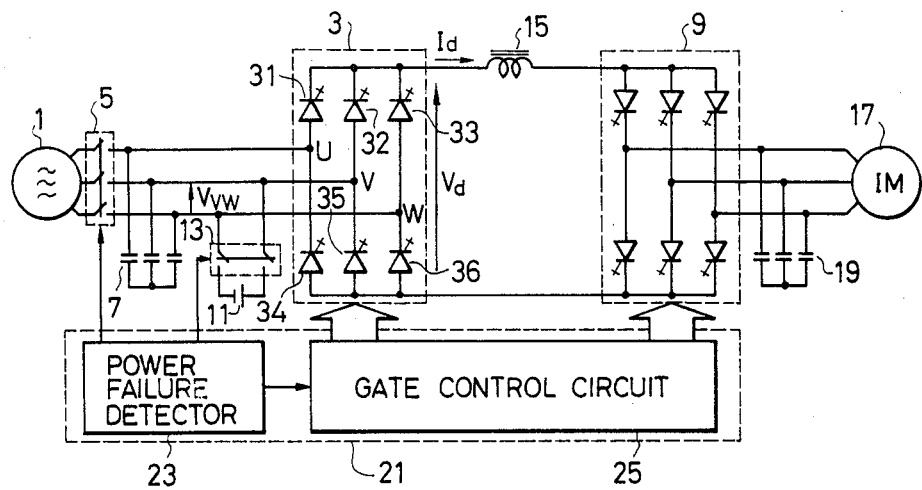
FIG. 1 is a schematic diagram showing a circuit of a current-source power converting apparatus according to an embodiment of the present invention.

Embodiments of the present invention will be explained in detail with reference to the accompanying drawings, wherein like parts in each of the several figures are identified by the same reference numerals and characters.

Referring at first to FIG. 1, a reference numeral 1 denotes a three phase AC power source, which supplies a three phase AC power for an AC-DC converter 3 through a three phase contactors 5. At an input end of the converter 3, three capacitors are provided, which are formed in a known star-connection and denoted as a whole by a reference numeral 7.

The AC-DC converter 3 is formed by a three phase bridge circuit, each arm of which is composed of a so called self-extinction device, such as a gate turn-off thyristor or a transistor. The self-extinction devices included in the respective arms are denoted by reference numerals 31, 32, 33, 34, 35 and 36. Since such an arrangement of the converter is well known, the further description thereabout is omitted here. A battery is provided between arbitrary two among three phases U, V and W of the AC power in order that it supplies a DC power for the converter 3 when the AC power source 1 fails. In this embodiment, the battery 11 is connected between the phases V and W through a contactor 13.

The DC power as an output of the converter 3, voltage and current of which are represented by reference characters $V_d$ and $I_d$, respectively, is supplied to a DC-AC inverter 9 through a DC reactor 15 which smooths the DC current $I_d$ flowing therethrough. In this embodiment, the DC-AC inverter 9 is also formed by a three phase bridge circuit which has six arms each including a self-extinction device. The arrangement of the inverter of this kind is also known. The inverter 9 inverts the DC power supplied from the converter 3 into an AC power, which is furnished to a load, i.e., a three phase induction motor 17 in a case of this embodiment. Further, capacitors, denoted as a whole by a reference numeral 19, are connected at an output end of the inverter 9.

There is further provided a control unit 21 consisting of a power failure detector 23 and a control circuit 25. The power failure detector 23 has a sensing part (not shown) equipped at an appropriate portion of the main circuit where the failure of the AC power can be watched. When the power failure occurs, the detector 23 produces output signals. One of the output signals is applied to the contactor 5, so that the contactor 5 is opened to detach the AC power source 1 from the converter 3. Another output signal is given to the contactor 13 to close it. Thereby the battery 11 is connected between the phases V and W. The last output signal is led to the control circuit 25 as a signal indicating occurence of the failure of the AC power.

The control circuit 25 consists mainly of gate control means for the converter 3 and the inverter 9. During the normal condition of the AC power source 1, the control circuit 25 operates in almost the same manner as a known gate control means for the converter or inverter of this kind. The operation thereof at the time of the power failure will be explained in detail later.

Figure 3A:
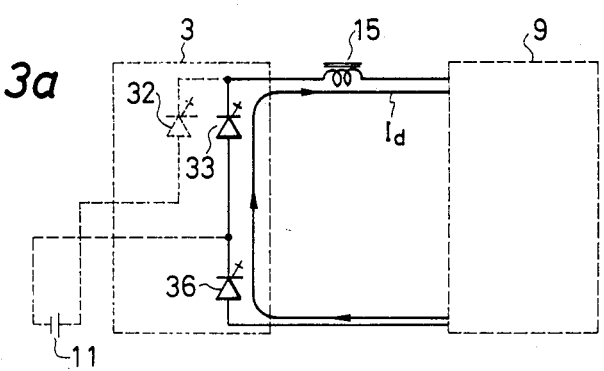
FIGS. 3a and 3b are diagrams for the purpose of explanation of the operation of the circuit shown in FIG. 1.
Figure 3B:
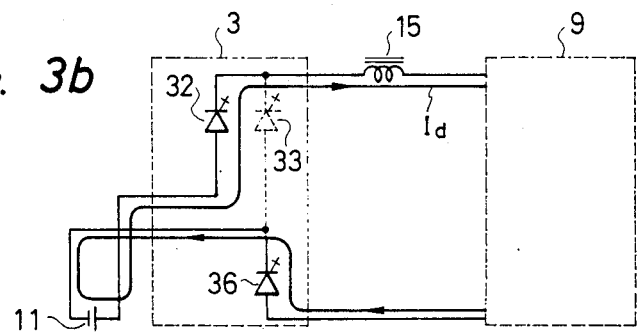

Next, the description is made of the operation of this embodiment, referring to FIG. 2 and FIGS. 3a and 3b.

In FIG. 2, it is assumed that the failure of the AC power occurs at a time point $t_0$, and therefore, through all figures of FIGS. 2 (a) to (g), the waveforms illustrated in the duration before the time point $t_0$ are those during the normal operation and the waveforms in the duration after the time point $t_0$ are those under the condition of the power failure. Further, in these figures, FIG. 2 (a) shows the waveform of voltage of the AC power source 1, in which the broken lines $V_U$, $V_V$ and $V_W$ represent phase voltages of the phases U, V and W, respectively, and the solid line $V_{VW}$ the line voltage with respect to the phases V and W between which the battery 11 is connected.

Gate signals of the converter 3 are as shown in FIG. 2 (b). The gate signals $P_{31}$, $P_{32}$, $P_{33}$, $P_{34}$, $P_{35}$ and $P_{36}$ are applied to gates of the self-extinction devices 31, 32, 33, 34, 35 and 36 of the converter 3, respectively. As is understood from the application manner of these gate signals, a so called PWM (Pulse Width Modulation) control method is applied to the converter 3 of this embodiment in order to adjust its output DC voltage during the normal operation.

The power failure detector 23 produces an output as shown in FIG. 2 (c) at the time point $t_0$ when it detects the power failure, and the contactors 5 and 13 operate as shown in (d) and (e) of FIG. 2, respectively, upon occurence of the output of the detector 23. Voltage $V_d$ and current $I_d$ of the DC power as an output of the converter 3 become as shown in (f) and (g) in the same figure.

Now, when the power failure is detected by the detector 23 at the time point $t_0$, the contactor 5 which was of ON state till then changes to OFF state and, on the contrary, the contactor 13 becomes ON state. Namely, the AC power source 1 is detached from the converter 3 and the battery 11 is connected between the phases V and W of the converter 3. As a result, the line voltage $V_{VW}$ between the phases V and W becomes equal to voltage E of the battery 11 (cf. FIG. 2 (a)).

After the time point $t_0$, the self-extinction device 36 is kept at ON state by applying the continuing gate signal thereto (cf. $P_{36}$ in FIG. 2 (b)), and the self-extinction devices 32 and 33 repeat ON and OFF states alternately (cf. $P_{32}$ and $P_{33}$ in the same). Here assuming that the gate signal P32 becomes a high level at a time point $t_1$ and the gate signal $P_{33}$ at a time point $t_2$, i.e., that the self-extinction device 32 becomes conductive at $t_1$ and the self-extinction device 33 turns on at $t_2$. In this case, the states of the circuit of the converter 3 for the durations of $t_0 \leq t < t_1$ and $t_1 \leq t < t_2$ are as shown in FIGS. 3a and 3b, respectively.

As is apparent from FIG. 3a, the self-extinction devices 33 and 36 are both in ON state, so that a DC circuit side falls into the short circuit state and the voltage $V_d$ becomes zero. At this time, the series connection of the self-extinction devices 33 and 36 functions as a freewheel diode, when being viewed from a side of the load. Therefore, this state of the circuit is called a freewheel-state. FIG. 3b shows the circuit state for the duration of $t_1 \leq t < t_2$. In this duration, the self-extinction device 36 is continuously conductive. The self-extinction device 33 changes to OFF state and the self-extinction device 32 becomes ON state. Accordingly, the battery 11 is connected to the DC circuit, so that the voltage $V_d$ becomes equal to the voltage E of the battery 11.

As is understood from FIG. 2, especially from $P_{32}$ and $P_{33}$ in the figure (b) thereof, the operation as described above is repeated over the duration of the power failure. As a result, the DC power with the voltage $V_d$ and the current $I_d$ as shown in (f) and (g) of FIG. 2 is obtained from the converter 3, and the DC power thus obtained is supplied for the inverter 9 through the DC reactor 15. Here, if the ON term of the self-extinction device 32, and accordingly the OFF term of the self-extinction device 33, is varied, the pulse width of the DC voltage $V_d$ changes so that the average value of the DC voltage $V_d$ changes. In this manner, the voltage of the DC power supplied for the inverter 9 can be controlled even at the time of failure of the AC power.

According to this embodiment, the main circuit of the current-source power converting apparatus is additionally provided by only a DC power supplying means as measures against the failure of the AC power, which is simply constructed by the battery 11 and the contactor 13. The main circuit usually has the contactor 5 as a main switch and therefore the signal from the power failure detector 23 can be applied to an actuator for the main switch. Accordingly, the main circuit is considerably simple in its structure, since the voltage control is performed by the gate control of the self-extinction devices of the converter 3. A circuit for such gate control as renders the self-extinction devices 32 and 33 conductive alternately and controls the duty ratio of the pulsing DC voltage $V_d$ can be easily achieved with a usually known electronic circuit techniquue.

Figure 4:
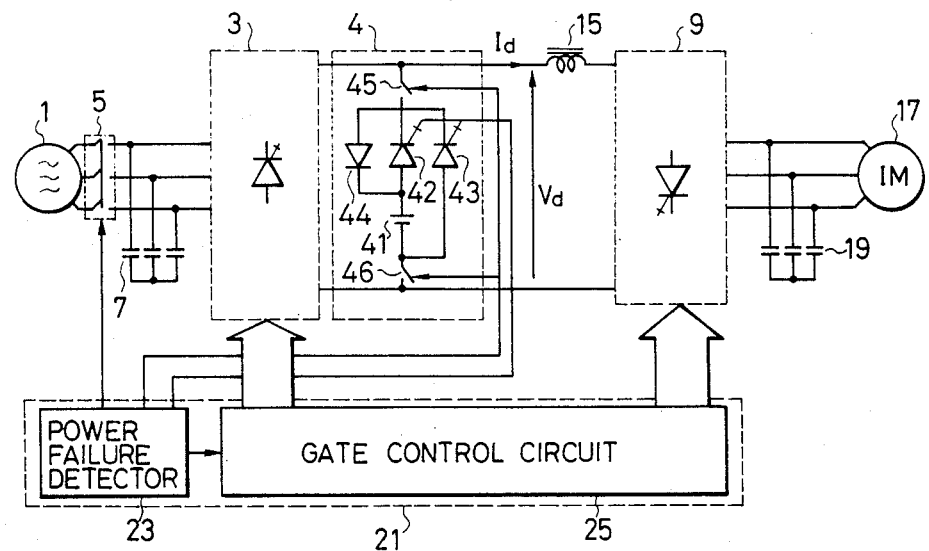
FIG. 4 is a schematic diagram showing a circuit of a current-source power converting apparatus according to another embodiment of the present invention.

FIG. 4 shows a current-source power converting apparatus according to another embodiment of the present invention. In this figure, the details of a converter 3 and an inverter 9 are omitted, since they are entirely the same as those in FIG. 1.

Referring to this figure, a DC power supplying means 4 as measures against the failure of the AC power is provided at the output end of the converter 3, i.e. in the DC circuit of the power converting apparatus. The DC power supplying means 4 comprises a series connection of a battery 41 and a self-extinction device 42 and another self-extinction device 43 connected in parallel with the series connection. The self-extinction device 42 has a diode 44 connected in reverse parallel therewith. Further, this arrangement of circuit is connected across output terminals of the converter 3 through contactors 45 and 46.

A power failure detector 23 in this embodiment produces four output signals, when it detects the power failure. The first output signal is sent to a contactor 5 to make it open and detach an AC power source 1 from the converter 3. The second output signal is given to the contactors 45 and 46 to close them. The third one is a gate signal for the self-extinction devices 42 and 43, which renders these devices 42, 43 conductive alternately, as described more in detail later. The last output signal of the detector 23 is led to a control circuit 25 as a signal indicating the occurence of the power failure. The first, second and third among the four output signals of the detector 23 are almost 'the same in their function as the signals produced by the power failure detector in FIG. 1.

Figure 6A:
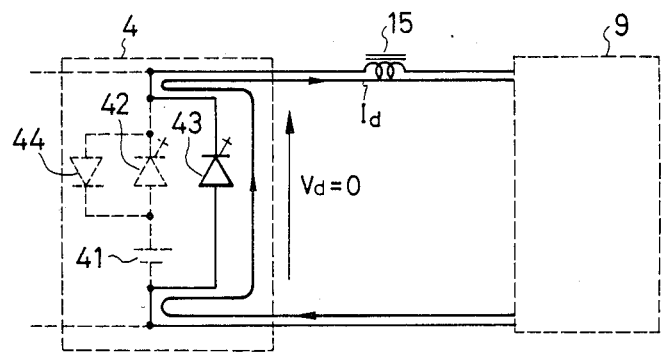
FIGS. 6a and 6b are diagrams for explaining the operation of the circuit shown in FIG. 4.
Figure 6B:
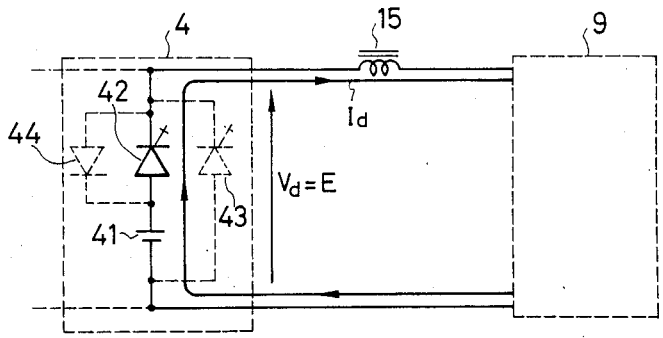

Referring now to FIG. 5 and FIGS. 6a and 6b, the description will be made of the operation of this embodiment, hereinafter.

Similarly to a case of FIG. 2, it is assumed in FIG. 5 that the failure of the AC power occurs at a time point $t_0$, and therefore, through all figures of FIGS. 5(a) to (i), the waveforms illustrated in the duration before the time point $t_0$ are those during the normal operation and the waveforms in the duration after the time point $t_0$ are those under the condition of the power failure. Further, FIGS. 5(a) to (e), (h) and (i) are the same as the corresponding figures of FIG. 2. As is apparent from these figures, the operation during the normal conditon is the same as that of the first embodiment shown in FIG. 1. Therefore, the explanation thereabout is omitted.

When the power failure occurs at the time point $t_0$, the detector 23 produces the output signal (cf. FIG. 5(c)). In response to the output signal, the contactor 5 becomes OFF state and the contactors 45 and 46 become ON state (cf. FIGS. 5(d) and (e)). Namely, the AC power source 1 is detached from the converter 3 and the DC power supplying means 4 is connected to the inverter 9 through a DC reactor 15. Further, as shown in FIG. 5(b), the gate signals $P_{31}P_{32}$, $P_{33}$, $P_{34}$, $P_{35}$ and $P_{36}$ to the converter 3 are all suppressed. After the time point $t_0$, the self-extinction devices 42 and 43 are given their gate signals $P_{42}$ and $P_{43}$ (cf. FIGS. 5(f) and (g)). Here assuming that the gate signal $P_{42}$ becomes a high level at a time point $t_1$ and the gate signal $P_{43}$ at a time point $t_2$, that is to say, that the self-extinction device 42 becomes conductive at $t_1$ and the self-extinction device 43 at $t_2$. In this case, the state of the circuit of the converter 3 for the durations of $t_0 \leq t < t_1$ and $t_1 \leq t < t_2$ are as shown in FIGS. 6a and 6b, respectively.

In the duration of $t_0 \leq t < t_1$, (cf. FIG. 6b), the self-extinction device 43 is in ON state, therefore a DC circuit side falls into the short circuit state and the voltage $V_d$ becomes zero. At this time, the self-extinction device 43 functions as a freewheel diode when being viewed from a side of the load. This state is the same as that shown in FIG. 3a, and therefore, this is also called a freewheel-state. FIG. 6b illustrates the circuit state for the duration of $t_1 \leq t < t_2$, in which the self-extinction device 42 is in ON state and the battery 41 is connected to the inverter 9. In this duration, the DC voltage $V_d$ becomes equal to the voltage E of the battery 41.

As is seen from FIGS. 5(f) and (g) showing the gate signals $P_{42}$ and $P_{43}$ applied to the self-extinction devices 42 and 43, the operation as mentioned above is repeated over the duration of the power failure. As a result, the DC power of the voltage $V_d$ and the current $I_d$ as shown in FIGS. 5(h) and (i) are obtained from the DC power supplying means 4, and the DC power thus obtained is supplied for the inverter 9 through the DC reactor 15. Similarly to the case in FIG. 2, the average value of the output voltage of the DC power supplying means 4 can be adjusted by controlling the duty ratio of the pulsing DC voltage $V_d$.

According to the second embodiment, the voltage of the DC power supplied for the inverter 9 can be controlled, not only when the AC power source 1 fails, but also at the time of the trouble of the converter 3.

Figure 7:
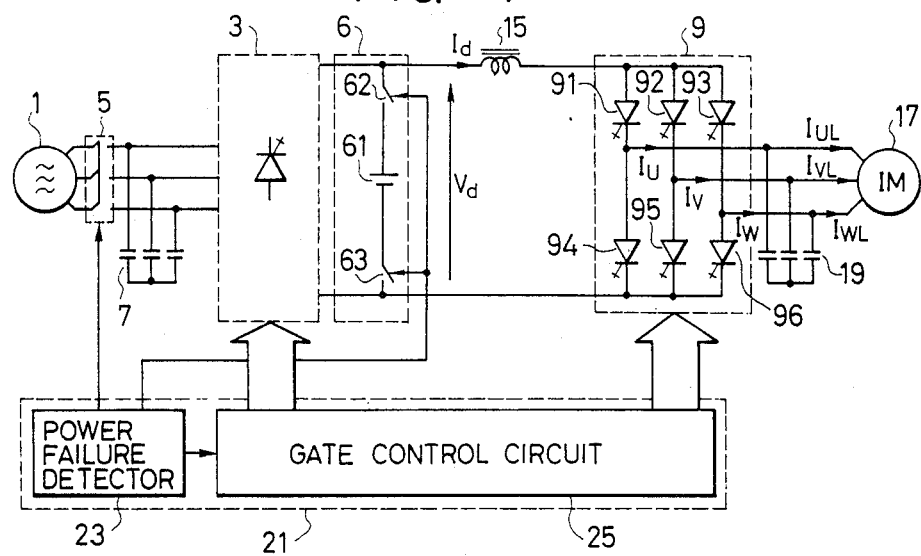
FIG. 7 is a schematic diagram showing a circuit of a current-source power converting apparatus according to still another embodiment of the present invention.

FIG. 7 is a schematic diagram showing a current-source power converting apparatus in accordance with still another embodiment of the present invention, in which, similarly to FIG. 4, the details of a converter 3 is omitted. However, an inverter 9 is illustrated in detail although it is the same as that in FIG. 1, because the following description of this embodiment is concerned with the control manner of the inverter 9. Therefore, the detailed illustration of the converter 9 in this figure is only for the purpose of convenience of understanding of this embodiment.

In the embodiment of FIG. 7, there is provided a DC power supplying means 6 of the simpler structure, compared with the DC power supplying means 4 in FIG. 4. Namely, the DC power supplying means 6 in this embodiment comprises a battery 61 and contactors 62, 63 connecting the battery 61 with a DC circuit of the power converting apparatus. The contactors 62, 63 are closed in response to a signal from a power failure detector 23, so that the DC power is supplied to an inverter 9 from the battery 61 through a DC reactor 15 at the time of failure of an AC power source 1.

Referring to FIG. 8, the explanation is done of the operation of this embodiment. As is understood from FIG. 8(b), the converter 3 is operated in the same manner as those in FIGS. 1 and 4, i.e. in the PWM mode, during the normal condition of the AC power source 1. However, the converter 3 in this embodiment is so controlled that its output DC power is maintained constant. The DC voltage $V_d$ and the DC current $I_d$ of the output DC power of the converter 3 are as shown in FIGS. 8(f) and (g), and the constant DC power is supplied for the inverter 9 through the DC reactor 15.

On the other hand, the inverter 9 is given gate signals $P_{91}$, $P_{92}$, $P_{93}$, $P_{94}$, $P_{95}$ and $P_{96}$ as shown in FIG. 8(h) and operated in the PWM mode. Consequently, the inverter 9 produces the output currents $I_U$, $I_V$, $I_W$ as shown by rectangular waveforms of FIG. 8(i) and the currents flowing through a load 17 become as $I_{UL}$, $I_{VL}$ and $I_{WL}$ shown by broken sinusoids of the same figure. Different from the inverters in two embodiments already described, the inverter 9 in this embodiment is able to control its output AC power by means of the PWM control operation.

Now, when the failure of the AC power source 1 is detected at the time point $t_0$ (cf. FIG. 8(a)), the detector 23 produces an output signal (cf. FIG. 8(c)). In reply to this output signal, the contactor 5 is opened and the contactors 62, 63 are closed so that the AC power source 1 is released and the battery 61 is connected to the DC circuit. Accordingly, after that, the DC voltage $V_d$ is kept at the voltage E of the battery 61 (cf. FIG. 8(f)). Further, after the time point $t_0$ the gate signals $P_{31}$, $P_{32}$, $P_{33}$, $P_{34}$, $P_{35}$ and $P_{36}$ of the converter 3 are all suppressed, similarly to the case of FIG. 5. However, the gate signals $P_{91}$, $P_{92}$, $P_{93}$, $P_{94}$, $P_{95}$ and $P_{96}$ continue to be applied to the corresponding self-extinction devices 91, 92, 93, 94, 95 and 96 of the inverter 9 (cf. FIG. 8(h)). Therefore, the output AC power of the inverter 9 is continuously controlled (cf. FIG. 8(i)).

Figure 9:
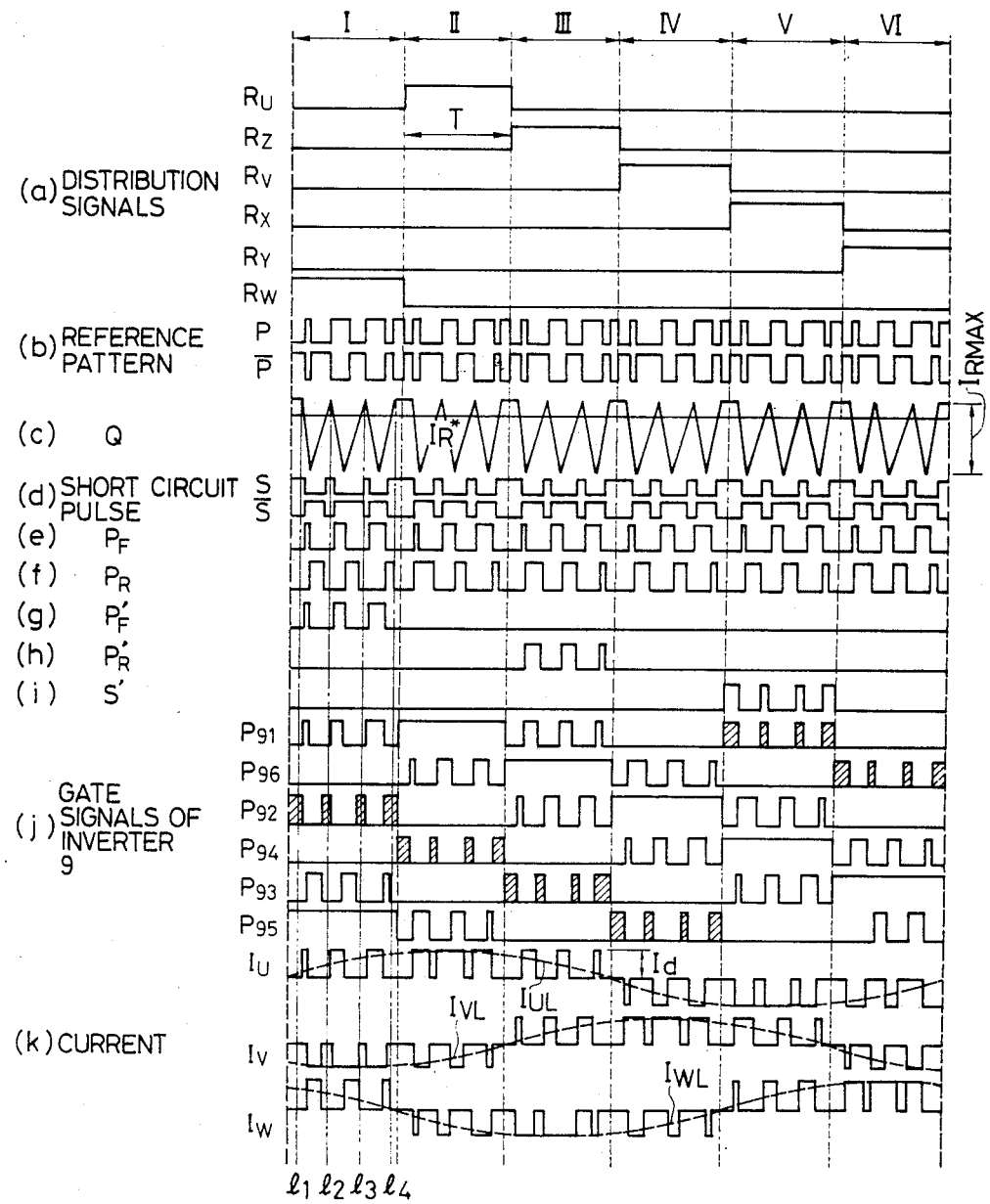
FIG. 9, shows the waveforms of signals and current which are applied to or derived from various parts of a DC-AC inverter used in the circuit shown in FIG. 7 during the failure of the AC power.

Referring next to FIG. 9, the AC output power control by the inverter 9 after the time point $t_0$, i.e. during the failure of the AC power, is explained hereinafter.

In this figure, distribution signals $R_U$, $R_Z$, $R_V$, $R_X$, $R_W$ and $R_Y$ (cf. FIG. 9(a)) are signals each of which has a pulse width T corresponding to an operational period 60° of the inverter 9 and is shifted by 60° in phase from one another. These distribution signals are obtained by dividing one cycle of the voltage of the AC power source 1 into six equal sections I to VI. A signal Q (cf. FIG. 9(c)) is a triangular wave signal which has a peak or a maximum value $I_{RMAX}$ at the time point of the leading edge of pulses of a reference pattern P for the PWM control (cf. FIG. 9(b)). The periods of individual triangular waves of the signal Q are determined by the width of the pulses of the reference pattern P and hence not uniform. A short-circuit pulse train S is made by comparing the triangular wave signal Q with an instruction $I_R^*$ of the AC output current (cf. FIGS. 9(c) and (d)). Next, the reference pattern P and the short-circuit pulse train S are inverted into signals $\overline{P}$ and $\overline{S}$, respectively. By taking the logical product between the signals P and S and between the signals $\overline{P}$ and $\overline{S}$, signals $P_F$ and $P_R$ are obtained (cf. FIGS. 9(e), and (f)).

Further, signals $P'_F$, $P'_R$ and $S'$ are obtained by the logical product of the signals $P_F$ and $R_Y$, of the signals $P_R$ and $R_Z$, and of the signals S and $R_X$ (cf. FIGS. 9(g), (h) and (i)), and the logical summation of the thus obtained signals $P'_F$, $P'_R$, $S'$ and the signal $R_U$ is conducted to get the gate signal $P_{91}$ to the self-extinction device 91 (cf. FIG. 9(j)). In the similar way, the gate signals $P_{92}$, $P_{93}$, $P_{94}$, $P_{95}$ and $P_{96}$ of the self-extinction devices 92, 93, 94, 95 and 96 of the inverter 9 can be made. The output current of the inverter 9 controlled by the gate signals $P_{91}$ to $P_{96}$ becomes the pulse-width-modulated rectangular current as shown by $I_U$, $I_V$, $I_W$ in FIG. 9(k). The currents flowing through the load are as shown by broken sinusoids $I_{UL}$, $I_{VL}$, $I_{WL}$ in the same figure.

Figure 11A:
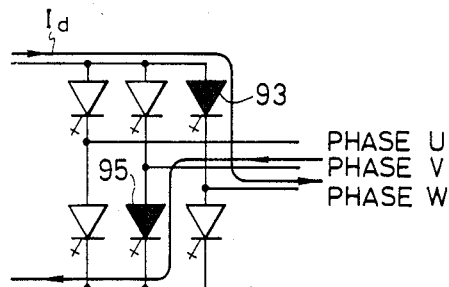
FIGS 11a, 11b and 11c are diagrams for explaining the operation of the DC-AC inverter used in the circuit shown in FIG. 7.
Figure 11B:
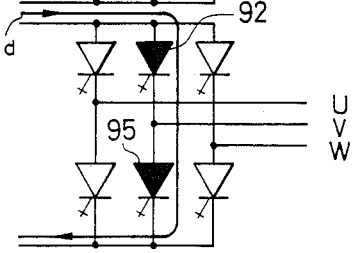
Figure 11C:
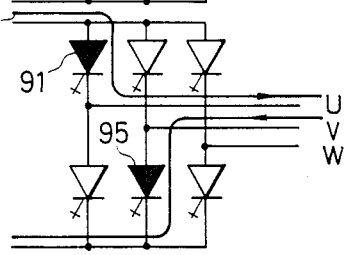

In order to facilitate a good understanding, the output control in the inverter 9 is explained more in detail, referring to FIG. 10 which, taking the section I shown in FIG. 9 as an example, illustrates the operation in the expanded form and to FIGS. 11a to 11c which indicate the circuit states in the duration from a time point $t_0$ to a time point $t_3$ shown in FIG. 10.

Referring at first to FIG. 10, the short-circuit pulse train S obtained, in this section I, by comparing the triangular wave signal Q with the current instruction $I_R^*$ corresponds to the gate signal $P_{92}$ given to the self-extinction device 92 (cf. FIGS. 10(b) and (e)). On the other hand, in the section I, the self-extinction device 95 is continuously given the gate signal $P_{95}$, as shown in FIG. 10(h). Therefore, the DC circuit of the power converting apparatus is short-circuited, as shown in FIG. 11b which shows the circuit state of the inverter 9 in the duration from the time point t1 to the time point t2. Accordingly, the currents IU, IV, IW in each phase U, V, W of the load become zero in this duration (cf. FIGS. 10(i), (j) and (k)). Before this duration, i.e. in the durarion from the time point t0 to the time point t1, the self-extinction devices 93 and 95 are made conductive (FIGS. 10(g) and (h)), so that the current flows through the load/in the phases V and W (cf. FIGS. 10(j) and (k) and FIG. 11(a). In the duration from the time point t2 to the time point t3, the self-extinction devices 91 and 95 become ON state (cf. FIGS. 10(c) and (g)), so that the current flows through the load in the phases U and V (cf. FIGS. 10(i) and (j), and FIG. 11(c).

As ;is apparent from FIG. 10, the inverter 9 is able to control the current flowing throught the load by successively repeating the three circuit states as shown in FIGS. 11a, 11b and 11c.

Now, assuming here that the conductive and non-conductive durations of the current in the respective phases are denoted by $d_0$ to $d_3$ and $d_{S1}$ to $d_{S3}$ as shown in FIGS. 10(i) to (k). Then, if the current instruction $I_R^*$ is varied from zero to the maximum value $I_{RMAX}$, the short circuit durations $d_{S1}$, $d_{S2}$, $d_{S3}$ in the current $I_U$ of the phase U changes from $d_1$, $d_2$ and $d_3$ to zero, respectively, holding the following relation:

$$\frac{d_{s1}}{d_1} = \frac{d_{s2}}{d_2} = \frac{d_{s3}}{d_3} = 1 - \frac{I_R^*}{I_{RMAX}} \quad (1)$$

The same relation is applicable to the current $I_W$ of the phase W. With respect to the current IV of the phase V, the following relation exists between $d_1$ to $d_3$ and $d_{S1}$ to $d_{S3}$:

$$\frac{d_{s1} + d_{s2}}{d_1 + d_2} = \frac{d_{s2} + d_{s3}}{d_2 + d_3} = \frac{d_{s3} + d_{s1}}{d_3 + d_1} = 1 - \frac{I_R^*}{I_{RMAX}} \quad (2)$$

In these circumstances, the effective value $I_{RMS}$ of the current $I_U$, $I_V$, $I_W$ becomes as follows:

$$I_{RMS} = \sqrt{\frac{2(d_1 + d_2 + d_3)}{3(d_0 + d_1 + d_2 + d_3 + d_4)} \times \frac{I_R^*}{I_{RMAX}}} \times I_d \quad (3)$$

When $I_R^* = 0$, the DC circuit of the power converting apparatus is in the short circuit state and therefore $I_{RMS}$ becomes equal to zero. Contrary, when $I_R^* = I_{RMAX}$, $I_{RMS}$ becomes as follows:

$$I_{RMS} = \sqrt{\frac{2(d_1 + d_2 + d_3)}{3(d_0 + d_1 + d_2 + d_3 + d_4)}} \times I_d \quad (4)$$

Namely, as is apparent from the equation (3) above, the effective value IRMS of the current $I_U$, $I_V$, $I_W$ changes in proportion to a square root of the current instruction $I_R^*$, since $I_d$, $I_{RMAX}$ and $d_0$ to $d_3$ are all constant.

As described above, the continuous operation of the power converting apparatus during the failure of the AC power is possible by only connecting the battery 61 in case the inverter 9 itself is able to control the output power.

Further, in this embodiment, there is an additional feature as follows. Namely, in this embodiment, the short circuit state of the DC circuit includes the battery 61 within the circuit (cf. FIG. 7 and FIG. 11 b). Therefore, energy is stored in the DC reactor 15 by the current $I_d$ flowing therethrough during the short circuit state. When the short circuit state is broken, that is to say, the circuit state changes from the state shown in FIG. 11b to that shown in FIG. 11c, for example, the energy stored in the DC reactor 15 is released toward the load 17. At this time, voltage (L $dI_d$ dt) is produced across the DC reactor 15, wherein L represents an inductance value of the DC reactor 15. Therefore, the condensor 19 connected to the output end of the inverter 9 can be charged by the sum of the voltage E of the battery 61 and the voltage (L $dI_d$/ dt) produced by the DC reactor 15. Accordingly, the load 17 can be applied by the voltage higher than the voltage E of the battery 61.

Although we have herein shown and described only limited number of forms of a current-source power converting apparatus embodying the present invention, it is to be understood that various changes and modifications may be made therein within the scope of the appended claims without departing from the spirit and scope of the present invention.

We claim:

1. A current-source power converting apparatus comprising:
    converter means including a plurality of self-extinction devices, said converter means being supplied by an AC power source for converting AC power into DC power;
    inverter means including a plurality of self-extinction devices for inverting the DC power converted by said converter means into AC power and for supplying the inverted AC power to an AC load;
    DC reactor means connected between said converter means and said inverter means;
    capacitor means connected at the output of said inverter means; and
    DC power supply means including a battery for supplying DC power and means for intermittently communicating the DC power between said battery and said inverter means when the AC power source fails.

2. A current-source power converting apparatus according to claim 1, wherein said DC power supply means includes said battery connected at the AC side of said converter means and said means for intermittently communicating the DC power controlling said self-extinction devices of said converter means for intermittently communicating the DC power through said DC reactor means when the AC power source fails.

3. A current-source power converting apparatus according to claim 1, wherein said DC power supply means includes a circuit comprising said battery and at least one other self-extinction device connected across output terminals of said converter means, said means for intermittently communicating the DC power controlling the at least other self-extinction device of said circuit for intermittently communicating the DC power through said DC reactor means when the AC power source fails.

4. A current-source power converting apparatus according to claim 1, wherein said DC power supply means includes said battery connected across output terminals of said converter means and said means for intermittently communicating the DC power controlling said inverter means for intermittently communicating the DC power when the AC power source fails.

* * * * *